United States Patent
Thomas et al.

(10) Patent No.: US 9,225,541 B2
(45) Date of Patent: Dec. 29, 2015

(54) MEDIA SHADOW FILES AND SYSTEM

(75) Inventors: Fred Charles Thomas, Ft. Collins, CO (US); Allen O Buckner, Ft. Collins, CO (US); Kevin Nay, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1118 days.

(21) Appl. No.: 13/059,378

(22) PCT Filed: Oct. 29, 2008

(86) PCT No.: PCT/US2008/081525
§ 371 (c)(1),
(2), (4) Date: Feb. 16, 2011

(87) PCT Pub. No.: WO2010/050934
PCT Pub. Date: May 6, 2010

(65) Prior Publication Data
US 2011/0153778 A1  Jun. 23, 2011

(51) Int. Cl.
*G06F 15/16* (2006.01)
*H04L 12/28* (2006.01)
*H04L 29/06* (2006.01)

(52) U.S. Cl.
CPC .......... *H04L 12/2812* (2013.01); *H04L 65/602* (2013.01); *H04L 2012/2849* (2013.01)

(58) Field of Classification Search
CPC ............... H04L 29/06489; H04L 29/06503; H04L 65/602; H04L 65/605; H04L 67/2823; H04N 21/2343
USPC .......................... 709/203, 217, 219, 231, 246
See application file for complete search history.

(56) References Cited

U.S. PATENT DOCUMENTS

| | | | | |
|---|---|---|---|---|
| 5,210,824 A | * | 5/1993 | Putz et al. | 715/201 |
| 5,911,776 A | * | 6/1999 | Guck | 709/217 |
| 6,742,043 B1 | * | 5/2004 | Moussa et al. | 709/232 |
| 2003/0126293 A1 | * | 7/2003 | Bushey | 709/246 |
| 2004/0024812 A1 | * | 2/2004 | Park et al. | 709/203 |
| 2007/0121651 A1 | * | 5/2007 | Casey et al. | 370/401 |
| 2007/0220024 A1 | * | 9/2007 | Putterman et al. | 707/101 |
| 2007/0226365 A1 | * | 9/2007 | Hildreth et al. | 709/231 |
| 2008/0001791 A1 | | 1/2008 | Wanigasekara-Mohotti et al. | |
| 2008/0059398 A1 | * | 3/2008 | Tsutsui | 707/1 |
| 2008/0147864 A1 | * | 6/2008 | Drogo De Iacovo et al. | 709/226 |

(Continued)

FOREIGN PATENT DOCUMENTS

| | | |
|---|---|---|
| CN | 1369832 A | 9/2002 |
| CN | 1725198 | 1/2006 |

(Continued)

OTHER PUBLICATIONS

"NERO MediaHome"; AII-Streaming-Media.com; Jul. 1, 2008; 3 pages.

(Continued)

*Primary Examiner* — Liangche A Wang
*Assistant Examiner* — Johnny Aguiar
(74) *Attorney, Agent, or Firm* — Thomas, Kaden, Horstemeyer & Risley, LLP

(57) ABSTRACT

One embodiment of a system for rendering media files comprises a computer configured to determine media file formats that are used by media rendering devices connected to a network and to determine media files available on the network. The computer generates media shadow files of media file formats used by the media rendering devices to accompany existing media files available on the network in alternative formats.

15 Claims, 4 Drawing Sheets

(56) References Cited

U.S. PATENT DOCUMENTS

| | | | |
|---|---|---|---|
| 2008/0181578 A1* | 7/2008 | Hanes | 386/124 |
| 2008/0231480 A1* | 9/2008 | Lai et al. | 341/51 |
| 2009/0055445 A1* | 2/2009 | Liu et al. | 707/203 |
| 2009/0119322 A1* | 5/2009 | Mills et al. | 707/101 |
| 2010/0042747 A1* | 2/2010 | Hascalovici et al. | 709/246 |
| 2010/0070608 A1* | 3/2010 | Hosur | 709/218 |
| 2011/0125809 A1* | 5/2011 | Woods et al. | 707/809 |

FOREIGN PATENT DOCUMENTS

| | | |
|---|---|---|
| CN | 101163087 | 4/2008 |
| TW | 200535647 A | 11/2005 |
| TW | 200811667 A | 3/2008 |
| WO | WO-0133874 A1 | 5/2001 |

OTHER PUBLICATIONS

Thomas, III, Fred Charles; "Notification of Transmittal of The International Search Report and The Written Opinion of The International Searching Authority, or The Declaration"; dated Apr. 22, 2009; cited in priority application PCT/US2008/081525 filed Oct. 29, 2008; 9 pages.

* cited by examiner

MEDIA SHADOW FILES AND SYSTEM

TECHNICAL FIELD

The present disclosure is generally related to computer networks and, more particularly, is related to rendering computer files available on a computer network.

BACKGROUND

Media files are often stored on a centralized storage asset in a home/entertainment/business network, where the media files may be serviced or rendered on a variety of devices attached to the network. Typically these rendering devices support one or only a few of the possible universe of formats or codecs available to render the media contents, where the word CODEC or codec may be a combination of any of the following: compressor-decompressor, coder-decoder, or compression/decompression algorithm.

Accordingly, there are various formats into which media files can be translated to or from their native or original versions so that they may be rendered by rendering devices. If a media file is not present on the storage device in the/a format (e.g., codec) supported by the rendering device, it is not presented to the user operating the rendering device. This is a problem, since the user of the rendering device has no idea what content other than that directly support by the device is in his or her digital video/music library.

SUMMARY

One embodiment of a system for rendering media files comprises a computer configured to determine media file formats that are used by media rendering devices connected to a network and to determine media files available on the network. The computer generates media shadow files of media file formats used by the media rendering devices to accompany existing media files available on the network in alternative formats.

One embodiment of a method of rendering media files comprises determining media file formats that are used by media rendering devices connected to a network; determining media files available on the network; and generating media shadow files of media file formats used by the media rendering devices to accompany existing media files available on the network in alternative formats.

One embodiment of a computer readable medium in accordance with the present disclosure has instructions executed by a computer and causes the computer to determine media file formats that are used by media rendering devices connected to a network; to determine media files available on the network; and to generate media shadow files of media file formats used by the media rendering devices to accompany existing media files available on the network in alternative formats.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
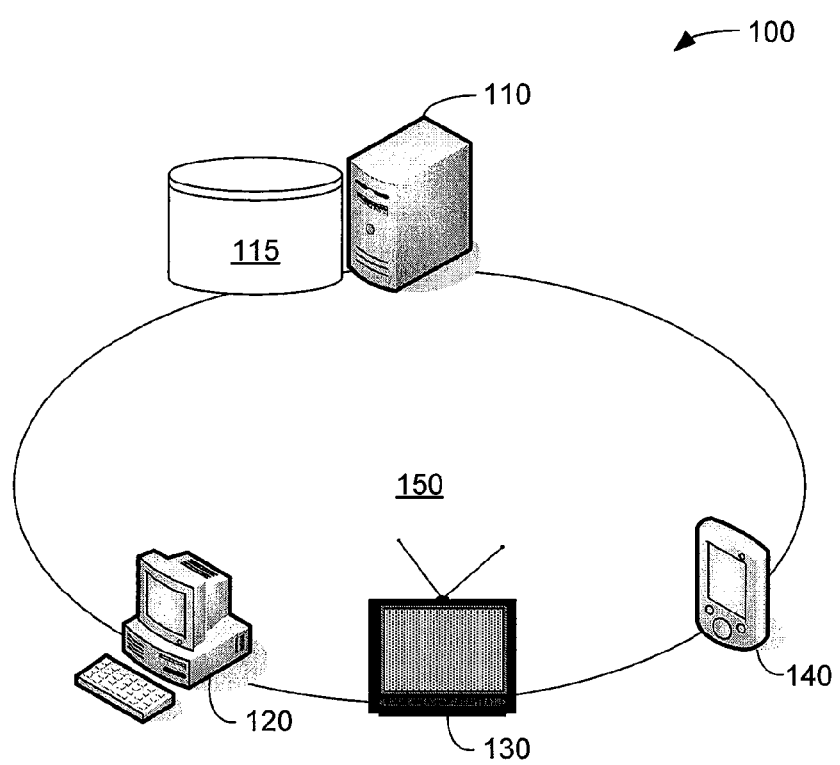
FIG. 1 is a block diagram of a media rendering system accordance with the present disclosure.

While embodiments of the present disclosure are susceptible to various modifications and alternative forms, exemplary embodiments thereof have been shown by way of example in the drawings and will herein be described in detail. It should be understood, however, that it is not intended be limited to the particular form disclosed.

FIG. 1 is a block diagram of a media rendering system 100 in which the methods, apparatuses, and systems of the present disclosure are advantageously applied. As part of the system 100, a media server 110 or a plurality of media servers interacts with one or more media rendering devices 120, 130, 140 on a network 150. In one embodiment, media server 110 is a computer that stores data files that are shared over the network 150 on a storage medium 115. For the storage medium 115, the media server 110 may, but is not limited to, contain internal storage drives for backup operations or to utilize external storage drives to which it has access.

The media server 110 may deliver media, e.g., streaming video or audio, to media rendering devices 120, 130, 140. Media to be delivered by the media server 110 may also included other types of files besides video and audio, including document files, spreadsheet files, drawing files, etc. A particular media rendering device 120, 130, 140 may only handle media of a particular file type. Therefore, the media server 110 should deliver or stream media files to a media rendering device 120, 130, 140 in the format that is accepted by the media rendering device 120, 130, 140. The media rendering device 120, 130, 140 is generally characterized as a computer or consumer electronic device that allows content from the media server 110 to be streamed to the device 120, 130, 140 and rendered by the device 120, 130, 140 or to a peripheral piece of equipment connected to the device, such as a television or stereo system, among others.

In one embodiment, the media system 100 comprises, but is not limited to being, a home network system having one or more computers capable of rendering media files from a media server 110. In one embodiment, the media server 110 backups up media files located on rendering devices 120, 130, 140 on the media server 110 and forms a media library for the network 150. Accordingly, the media server 110 may provide remote access to media files and enable media delivery, such as streaming, to rendering devices 120, 130, 140 on the network 150. In one embodiment, UPnP (universal plug-n-play) is a protocol utilized by the media server 110 and rendering devices 120, 130, 140. Using UPnP, media, such as movies, music, photos, is streamed from the media server 110 over a wired or wireless network to rendering devices 120, 130, 140. In such an embodiment, media rendering devices 120, 130, 140 may include console devices that use the wired/wireless network to connect to home stereos or televisions; gaming consoles that connect (via wires or wirelessly) to the media server; televisions that are designed to connect seamlessly with the media server 110 and play media streaming formats, etc. These types of media rendering devices 120, 130, 140 are also commonly referred as digital media adapters or media center extenders. Further, computers, personal digital assistants, etc. may also display and receive media files, and are regarded as types of media rendering devices 120, 130, 140.

Conversion of audio and video files to the variety of formats (e.g., codecs) required for consumption by the various rendering devices 120, 130, 140 found on a home and entertainment (or business) network 150 may be performed to ensure that rendering devices 120, 130, 140 are able to render media content. This involves determining what media files formats are required by all rendering devices 120, 130, 140 on the network 150 and then converting all media files to these formats for future rendering. This results in the consumption of multiple large segments of digital storage space to store essentially the same content in a variety of different formats (e.g., codecs).

Further, since rendering devices 120, 130, 140 may support one or only a few of the possible universe of formats (e.g., codecs) possibly available, if a media file is not present on a storage device 115 in the/a format (e.g., codec) supported by the rendering device 120, 130, 140, the media file is not presented to the user operating the rendering device 120, 130, 140. This problem is addressed by the solution offered by embodiments of the present disclosure, where the present disclosure describes media content (Audio/Video/multi-media) shadow files and the accompanying systems and methods for selective generation of appropriate format shadow files based on the requirements of the various rendering devices 120, 130, 140 found located on an attached network 150.

In accordance with the present disclosure, the media server 110 is configured to determine, using uPNP or other device discovery mechanisms, which devices and software on the network 150 have the requirement to render media files resident on the media server 110 and what file formats (e.g., codecs) these devices or software require. The determination of files formats used by these media rendering devices 120, 130, 140 may take the form of a regularly updated table of possible rendering devices or software and their requirements relative to media formats (e.g., codecs), where this table may be cross-referenced by the media server 110. Table 1 lists several of these common video and audio codecs and corresponding container or file formats for audio and video content.

TABLE 1

| VIDEO CODECS | AUDIO CODECS | CONTAINER FORMATS |
| --- | --- | --- |
| All QuickTime Codecs | All QuickTime Codecs | QuickTime: .mov |
| MPEG-1 | MP3 | MPEG-4: .mp4 .m4v |
| MPEG-2 | AAC | AVI: .avi |
| MPEG-4 (DivX, XviD, etc.) | WAV | MPEG: .mpg .mpeg .m1v .m2v .vob .ts .m2t |
| MSMPEG4 | AIFF | WMV: .asf .wmv |
| WMV7 | PCM | DV: .dv |
| WMV8 (partial) | AC3 | 3GPP: .3gp |
| WMV9 | MP2 | Flash Video: .flv .swf |
| H.263 | Ogg Vorbis | Ogg Media Container: .ogm |
| H.264 | WMA | Matroska: .mkv |
| Flash Video 6/7 | Legacy RealAudio | Legacy RealMedia: .rm |
| Flash Video 8 (VP62) | Many other specialized codecs | |
| MotionJPEG | | |
| DV | | |
| HDV | | |
| Cinepak | | |
| Legacy RealVideo (RV20) | | |
| Ogg Theora | | |
| Snow | | |
| Indeo 2/3 | | |
| Many other specialized codecs | | |

Based on rendering-system media file format requirements discovered on the network 150, the media server 110 accounts for all applicable media files to all required media formats used by rendering devices on the network 150 in the form of shadow files. These shadow files are stored in the same directory as their initial source media file, in one embodiment, or in some other directory based on a predetermine storage hierarchy.

In one embodiment, AV (audio/video) shadow files are generated to provide AV files in formats other than that of the full length initial codec format the AV file is obtained/stored in originally. Hence, this provides the appearance that many different formats of a single AV file are available for rendering, while requiring a fraction of the storage capacity necessary to provide full versions of these additional AV formats.

In one embodiment, the AV shadow file has the file extension of the codec format the file was created to mimic. Therefore, the AV shadow file is represented to a user as operating on a rendering device 120, 130, 140 utilizing the codec format, while not burdening the media server 110 with the requirement of storing the files full content in every video/audio format needed for all rendering devices 120, 130, 140 resident on the network 150. For example, a typical DMA (digital media adaptors), may only support 2 or 3 video codecs. As an example, a DMA may support two of the MPEG-4 video formats such as DivX and XviD. Assume, a hypothetical person downloaded some WMV9 (Microsoft Windows Media® version 9) video files. If this person uses the DMA to access the files on the media server 110 via the network 150, this new video file will not be visible to the DMA user, since it is not in a format consumable by that DMA. However, the generation of shadow files by the media server 110 automatically averts this problem while minimizing the storage resources used to do so.

Further, in some embodiments, the AV shadow file may include some short portion of the original AV file converted to the secondary codec of the AV shadow file. In addition, imbedded in the AV shadow file, instructions may be included for the media server 110 to initiate the conversion of the primary or native AV file format to the AV shadow file representative codec. Sequentially, the AV shadow file for the purposes of video or audio streaming emulates a fully transcoded AV file in the secondary codec format by the media server 110 streaming content from the initially transcoded portion of the file in the secondary codec, and then streaming the remainder of the file by transcoding the remainder of the file in real-time or on-the-fly from the original AV file (e.g., codec) formatted file to the codec representative of the AV shadow file.

Figure 2:
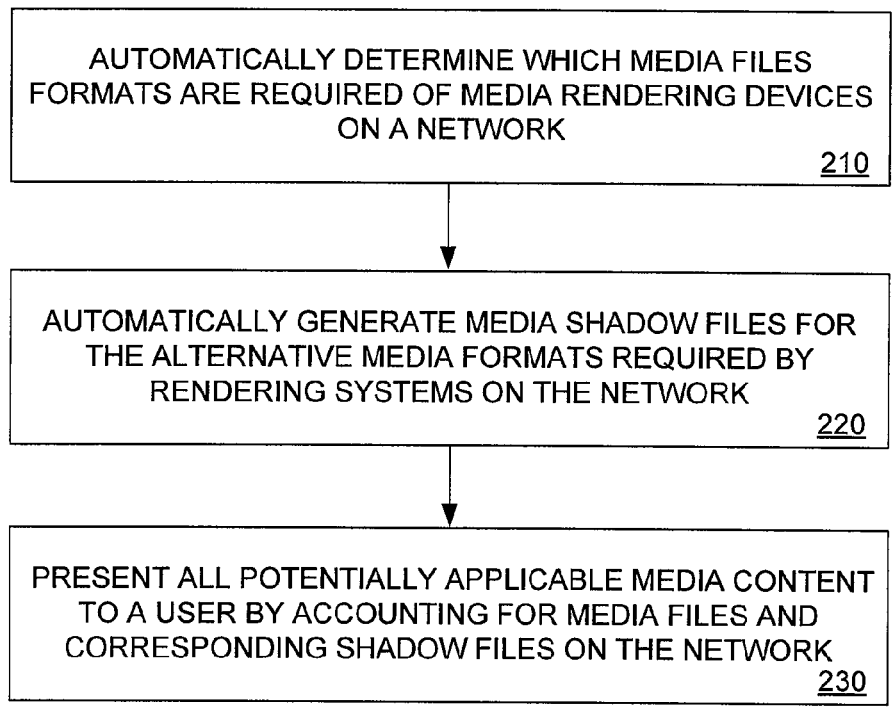
FIG. 2 is a flow chart diagram depicting functionality and operation of an embodiment of a media server from FIG. 1.

Referring now to FIG. 2, a flow chart is depicted which shows the functionality and operation of an embodiment of the media server 110. In this regard, each block represents a module, segment, or portion of code, which comprises one or more executable instructions for implementing the specified logical function(s). It should also be noted that in some alternative implementations, the functions noted in the blocks may occur out of the order noted in FIG. 2. For example, two blocks shown in succession in FIG. 2 may in fact be executed substantially concurrently or the blocks may sometimes be executed in the reverse order, depending upon the functionality involved, as will be further clarified hereinbelow.

In FIG. 2, a media server 110 automatically determines which media files formats are required of media rendering devices 120, 130, 140 and software on the network 150, as shown in block 210. In block 220, the media server 110 automatically generates media shadow files for the alternative media formats required by rendering systems on the network 150. In the case of AV shadow files, these AV shadow files provide equivalent content streaming capability of their representative AV formats (e.g., codecs) while consuming a fraction of the data storage space. In this manner, media rendering devices 120, 130, 140 on the network 150 present all potentially applicable media content to their users by accounting for media files and corresponding shadow files on the network, as shown in block 230.

Figure 3:
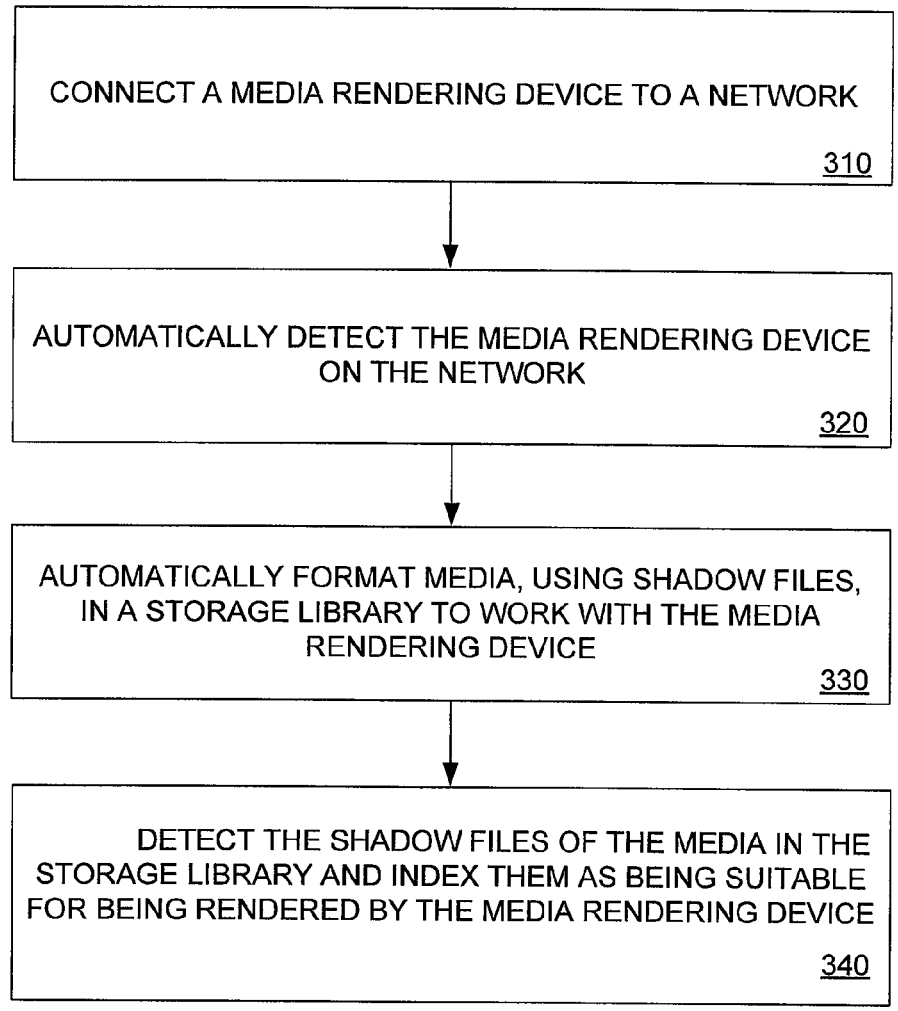
FIG. 3 is a flow chart diagram describing an exemplary method of the present disclosure.

Next, FIG. 3 is a flow chart describing an exemplary method of the present disclosure. In block 310, a media rendering device 120, 130, 140 is connected or plugged into a network 150. A media server 110 on the network 150 automatically detects the media rendering device 120, 130, 140 on the network in block 320. The media server 110 then automatically formats media using shadow files in a storage library to work with the media rendering device 120, 130, 140, as depicted in block 330. The media rendering device 120, 130, 140 detects the shadow files of the media in the storage library and indexes them as being suitable for being rendered by the media rendering device 120, 130, 140, as depicted in block 340.

For example, the shadow file may appear to be in an Adobe Portable Document Format (PDF) having a .pdf file extension. The corresponding file format of the media content is a Microsoft Word format having a .doc file extension. After the shadow file (having the .pdf extension) is accessed by the media server 110 so that it may be delivered to the media rendering device 120, 130, 140, the media server 110 executes instructions in the shadow file (e.g., a call to launch a Word to PDF conversion program) to make a PDF version of the file on-the-fly so that the file contents may be delivered to the rendering device 120, 130, 140. After delivery of the file, the media server 110, in some embodiments, deletes the newly created file at the storage device 115 to save storage space. Alternatively, in some embodiments, the media server 110 retains the newly created file, since a need has been shown for the file and a need may therefore come again on the network 150.

Certain embodiments of the present disclosure can be implemented in hardware, software, firmware, or a combination thereof. In some embodiment(s), media server components and other components are implemented in software or firmware that is stored in a memory or other computer readable medium and that is executed by a suitable instruction execution system. If implemented in hardware, as in an alternative embodiment, components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
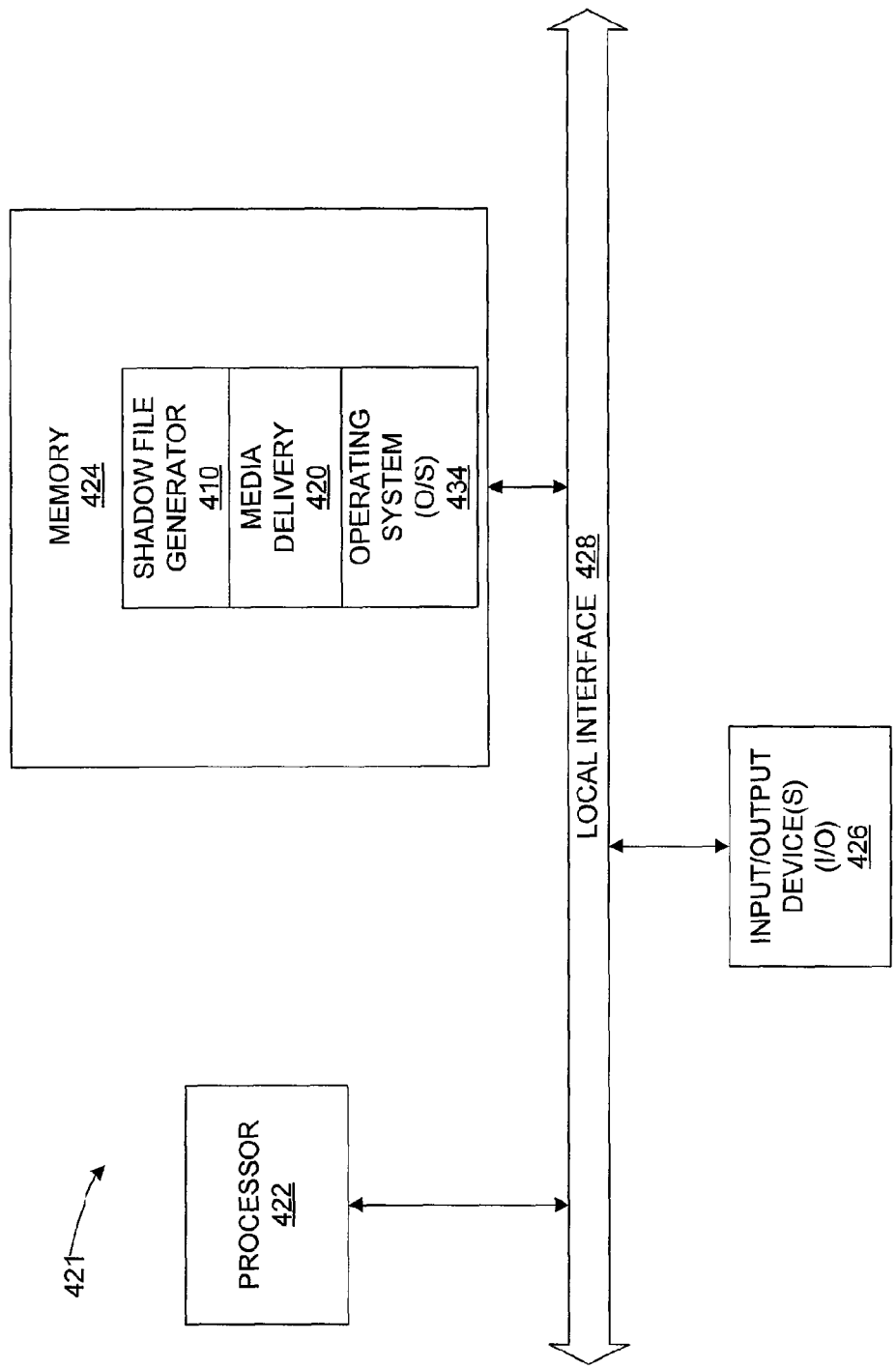
FIG. 4 is a block diagram of an embodiment of a computer-based device which implements components of the media server from FIG. 1.

An example of an instruction execution system that can implement the media server components of the present disclosure is a computer-based device 421 ("computer") which is shown in FIG. 4. Generally, in terms of hardware architecture, as shown in FIG. 4, the computer 421 includes a processor 422, memory 424, and one or more input and/or output (I/O) devices 426 (or peripherals) that are communicatively coupled via a local interface 428. The local interface 428 can be, for example but not limited to, one or more buses or other wired or wireless connections, as is known in the art. The local interface 428 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 422 is a hardware device for executing software, particularly that stored in memory 424. The processor 422 can be any custom made or commercially available processor, a central processing unit (CPU), an auxiliary processor among several processors associated with the computer 421, a semiconductor based microprocessor (in the form of a microchip or chip set), a macroprocessor, or generally any device for executing software instructions.

The memory 424 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 424 may incorporate electronic, magnetic, optical, and/or other types of storage media. Note that the memory 424 can have a distributed architecture, where various components are situated remote from one another, but can be accessed by the processor 422.

The software in memory 424 may include one or more separate programs, each of which comprises an ordered listing of executable instructions for implementing logical functions. In the example of FIG. 4, the software in the memory 424 includes the media server components, such as shadow file generating component 410 and media delivery component 420, in accordance with the present disclosure and a suitable operating system (O/S) 434. Shadow file generating component 410 creates a shadow file, as described above, and the media delivery component 420 delivers media content from a media file, which had been represented by a shadow file, as described above. The operating system 434 controls the execution of other computer programs and provides scheduling, input-output control, file and data management, memory management, and communication control and related services.

I/O devices 426 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the computer 421 is in operation, the processor 422 is configured to execute software stored within the memory 424, to communicate data to and from the memory 424, and to generally control operations of the computer 421 pursuant to the software. The shadow file generating component 410, media delivery component 420, and the O/S 434, in whole or in part, but typically the latter, are read by the processor 422, perhaps buffered within the processor 422, and then executed.

In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of the present disclosure includes embodying the functionality of the embodiments of the present disclosure in logic embodied in hardware or software-configured mediums.

As previously described, one embodiment of a system for rendering media files comprises a computer 421 configured to determine media file formats that are used by media rendering devices 120, 130, 140 connected to a network 150 and to determine media files available on the network 150, wherein the computer 421 generates media shadow files of media file formats used by the media rendering devices to accompany existing media files available existing on the network 150 in alternative formats.

In one embodiment, a media shadow file comprises a computer file having an indication that the file contains media contents in a particular file format.

In one embodiment, the computer 421 generates the media contents in the particular file format by converting a media file in alternative file format to the particular file format after the computer 421 receives an initial request to deliver contents of the media shadow file.

In one embodiment, the computer 421 delivers the contents of the media shadow file by streaming the contents to a requesting device 120, 130, 140.

In one embodiment, the shadow file comprises an initial portion of the media content in the particular file format and further comprises instructions for transcoding a remaining portion of the media content into the particular file format.

It should be emphasized that the above-described embodiments are merely possible examples of implementations, merely set forth for a clear understanding of the principles of the disclosure. Many variations and modifications may be made to the above-described embodiment(s) without departing substantially from the principles of the disclosure. For example, a computer, besides a server that delivers or streams media content to rendering devices, may make the determinations of which file formats are used on the network and may generate the shadow files on the network. All such modifications and variations are intended to be included herein within the scope of this disclosure and protected by the following claims.

Therefore, having thus described various embodiments, at least the following is claimed:

1. A system for rendering media files comprising:
   a computer to determine media file formats used by media rendering devices connected to a network, to store the determined media file formats in a data structure, and to determine existing media files available on the network, wherein the computer generates media shadow files for each of the determined media file formats used by the media rendering devices to accompany each of a number of existing media files available in an initial file format on the network, each of the media shadow files imitating each of the determined media file formats accompanying each existing media files and indicating that a fully transcoded media file is available in the determined media file formats used by the media rendering devices;
   wherein the media shadow files each comprise an initial portion less than the whole of media content of each of the existing media files in a particular file format and further comprises instructions for transcoding a remaining portion of the media content from the initial file format into the particular file format;
   wherein the initial portion of each of the media content associated with each of the media shadow files is streamed while the remaining portion of the media content of each of the media shadow files are transcoded in real time from the existing media files accompanied with the media shadow files; and
   wherein, after delivery of the media content associated with each of the media shadow files, the remaining portion of the media content of each of the media shadow files is deleted.

2. The system of claim 1, wherein each of the media shadow files comprise an indication that each of the media shadow files contain the initial portion of media content in the particular file format.

3. The system of claim 2, wherein the computer generates media contents associated with each of the existing media files in the particular file format by converting a media file in the initial file format to the particular file format after the computer receives an initial request to deliver contents of a particular media shadow file among the media shadow files.

4. The system of claim 3, wherein the computer delivers the contents of the media shadow file by streaming the contents to a requesting device.

5. The system of claim 2, wherein the indication comprises a file extension of a codec format of the particular file format.

6. The system of claim 1, wherein the computer stores a list of the media rendering devices in the data structure and updates the data structure based on a change in the media rendering devices connected to the network.

7. The system of claim 1, wherein the data structure is a table.

8. A non-transitory computer readable medium having instructions executed by a computer which causes the computer to:
   determine media file formats used by media rendering devices connected to a network;
   store the determined media file formats in a data structure;
   determine media files available on the network; and
   generate media shadow files for each of the determined media file formats used by the media rendering devices to accompany each of a number of existing media files available in an initial file format on the network, each of the media shadow files imitating each of the associated determined media file formats accompanying each existing media files and representing that a fully transcoded media file is available in the determined media file formats used by the media rendering devices;
   wherein the media shadow files each comprise an initial portion less that the whole of media content of each of the existing media files in a particular file format and further comprises instructions for transcoding a remaining portion of the media content from the initial file format into the particular file format;
   wherein the initial portion of media of each of the media content associated with each shadow files is streamed while the remaining portion of the media content of each of the media shadow files are transcoded in real time from the existing media files accompanied with the media shadow files; and
   wherein, after delivery of the media content associated with each of the media shadow files, the remaining portion of the media content of each of the media shadow files is deleted.

9. The non-transitory computer readable medium of claim 8, wherein each of the media shadow files comprise an indication that each of the media shadow files contain the initial portion of media contents in the particular file format.

10. The non-transitory computer readable medium of claim 9, further comprising instructions to:
    generate media contents associated with each of the existing media files in the particular file format by converting a media file in the initial file format to the particular file format after the computer receives an initial request to deliver contents of a particular media shadow file.

11. The non-transitory computer readable medium of claim 10, further comprising instructions to:
deliver the contents of the media shadow file by streaming the contents to a requesting device.

12. A method of rendering media files comprising:
determining media file formats used by media rendering devices connected to a network;
storing the determined media file formats in a data structure of a computing device;
determining media files available on the network; and
generating media shadow files for each of the determined media file formats used by the media rendering devices to accompany each of a number of existing media files available in an initial file format on the network;
wherein each of the media shadow files imitate each of the determined media file formats accompanying each existing media files and signify to each of the media rendering devices that a fully transcoded media file is available in the determined media file formats used by the media rendering devices;
wherein the media shadow files each comprise an initial portion less than the whole of media content of each of the existing media files transcoded by a processor of the computing device in the particular file format and further comprises instructions for transcoding a remaining portion of the media content from the initial file format into the particular file format;
wherein the initial portion of each of the media content associated with each of the media shadow files is streamed while the remaining portion of each of the media shadow files are transcoded in real time from the existing media files accompanied with the media shadow files; and
wherein, after delivery of the media content associated with each of the media shadow files, the remaining portion of the media content of each of the media shadow files is deleted.

13. The method of claim 12, wherein each of the media shadow files comprise an indication that each of the media shadow files contain the initial portion of media contents in the particular file format.

14. The method of claim 13 further comprising:
generating media contents associated with each of the existing media files in the particular file format by converting a media file in the initial file format to the particular file format after the computing device receives an initial request to deliver contents of a particular media shadow file.

15. The method of claim 14 further comprising:
delivering the contents of the media shadow file by streaming the contents to a requesting device.

* * * * *